United States Patent
Glass

(10) Patent No.: US 6,422,585 B1
(45) Date of Patent: Jul. 23, 2002

(54) VISUAL ALIGNMENT AID FOR CONNECTING TRAILERS

(75) Inventor: James L. Glass, 103 Doral Cir., Naples, FL (US) 34113

(73) Assignee: James L. Glass, Naples, FL (US)

( * ) Notice: Subject to any disclaimer, the term of this patent is extended or adjusted under 35 U.S.C. 154(b) by 0 days.

(21) Appl. No.: 09/878,436

(22) Filed: Jun. 12, 2001

Related U.S. Application Data

(63) Continuation-in-part of application No. 09/756,517, filed on Jan. 9, 2001.

(51) Int. Cl.$^7$ ............................................. G02B 7/182
(52) U.S. Cl. ..................... 280/477; 280/432; 224/309
(58) Field of Search .................................. 280/477, 432; 359/841; 224/309–331, 400–499; 248/467, 474, 476, 479, 495, 480; 33/264; 403/378

(56) References Cited

U.S. PATENT DOCUMENTS

| | | | | |
|---|---|---|---|---|
| 855,152 A | * | 5/1907 | Wilson | |
| 4,163,606 A | * | 8/1979 | Granno | 350/307 |
| 4,733,681 A | * | 3/1988 | Lee | 135/16 |
| 5,124,857 A | * | 6/1992 | Pitz | 359/872 |
| 5,292,045 A | * | 3/1994 | Mandel | 224/309 |
| 5,482,310 A | * | 1/1996 | Staggs | 280/477 |
| 5,520,474 A | * | 5/1996 | Liu | 403/97 |
| 5,787,590 A | * | 8/1998 | D'Alessandro, Sr. | 30/296.1 |
| 6,102,423 A | * | 8/2000 | Beck et al. | 280/477 |
| 6,239,926 B1 | * | 5/2001 | De Shazer | 359/841 |
| 6,254,305 B1 | * | 7/2001 | Taylor | 403/378 |

* cited by examiner

*Primary Examiner*—Avraham Lerner
*Assistant Examiner*—Tony Winner

(57) ABSTRACT

The invention is a visual alignment aid device that is supported on a towing vehicle to aid in the alignment of the ball on the towing vehicle with the socket in the trailer of the vehicle to be towed, The device includes an elongated tubular shaft having a telescoping shaft sliding and rotationally received therein. The telescoping shaft can be arrested in any position relative to the tubular shaft. The telescoping shaft further has a section with a rigid bend therein. The bend can include an angle of at least 90° and up to 180° depending on the vehicle on which the alignment device is supported. At an end of the telescoping shaft a sleeve is separably mounted which sleeve has an extension which supports a convex mirror in an eccentric fashion.

10 Claims, 3 Drawing Sheets

VISUAL ALIGNMENT AID FOR CONNECTING TRAILERS

CROSS REFERENCE TO RELATED APPLICATION

This application is a Continuation-In-Part of copending application Ser.No. 09/756,517 filed on Jan. 9, 2001.

BACKGROUND OF THE INVENTION

The present invention pertains to a visual alignment aid device for aiding a driver of a towing vehicle when connecting a trailer. In particular, the visual aid device helps in aligning the ball on a hitch of a towing vehicle relative to the socket on the tongue of the trailer to be towed by using an adjustable convex mirror on the alignment device which is removably attached to the towing vehicle. The aid device can easily be folded into a compact configuration for convenient storage.

DESCRIPTION OF THE PRIOR ART

Various devices have been designed and constructed to visually facilitate connecting a towing vehicle to a trailer to be towed. Most of the devices involve a mirror and therefore are also visual aid devices permitting the driver of the towing vehicle a direct visual observation of the alignment of the ball on the hitch of the towing vehicle relative to the socket on the tongue of the trailer.

U.S. Pat. No. 5,180,182 discloses such a device. It consists of three parts which are hingedly connected to each other at their respective edges and support a convex mirror attached to the third part in a position which is normal to the line of the vision of a person attempting to align the towing vehicle and the trailer. There are notches provided so that the assembled device can be mounted on the edge of a tail gate of a pickup truck. It also allows the trailer hitch alignment device to be mounted on the edge of a partially raised rear window of a vehicle so equipped. The device can be collapsed into a compact configuration for easy storage by folding the three parts on top of each other. The above described device can only be attached to a vehicle having a rear edge available for mounting but cannot be mounted on a flat surface horizontally or vertically.

U.S. Pat. No. 4,905,376 discloses another device providing a visual aid when connecting a towing vehicle to a trailer. This device is of a much more complicated construction in that it involves clamps to be attached to a tail gate of a pickup truck. A convex mirror is attached to carrying bars and is frictionally mounted between the spring clamps. The mirror itself is movably mounted on the bars. There is no disclosure that this device can be mounted on any other type of towing vehicle. This same patent discloses another device providing a visual aid when connecting a towing vehicle to a trailer to be towed. This device uses the same complicated structure except that instead of using spring clamps it uses magnets to attach the device to a trunk lid of a passenger vehicle.

U.S. Pat. No. 5,309,289 discloses a further visual aid device for connecting a towing vehicle to a trailer. This device is not to be mounted on the towing vehicle at all but is permanently attached to the tongue of the trailer to be towed itself. This is not the object of the invention.

BRIEF SUMMARY AND OBJECTS OF THE INVENTION

One object of the invention is to construct a very simple but effective and versatile device that can be constructed at a low cost. Another object of the invention is to simplify the initial mounting of the visual aid device on a vehicle no matter what type of a vehicle is or what size or dimension. An elongated bar has either spaced apart suction cups or magnets located on the bar that will attach the bar and thereby the device to either a flat or a curved surface or spaced apart surfaces such as are found on a pickup truck. The convex mirror then is oriented so that the driver can see the ball which is mounted on the hitch at the rear of the vehicle. The application at hand has an object to simplify the structure of the copending application and to reduce the cost of manufacturing the same.

DETAILED DESCRIPTION OF THE DRAWINGS

Figure 1:
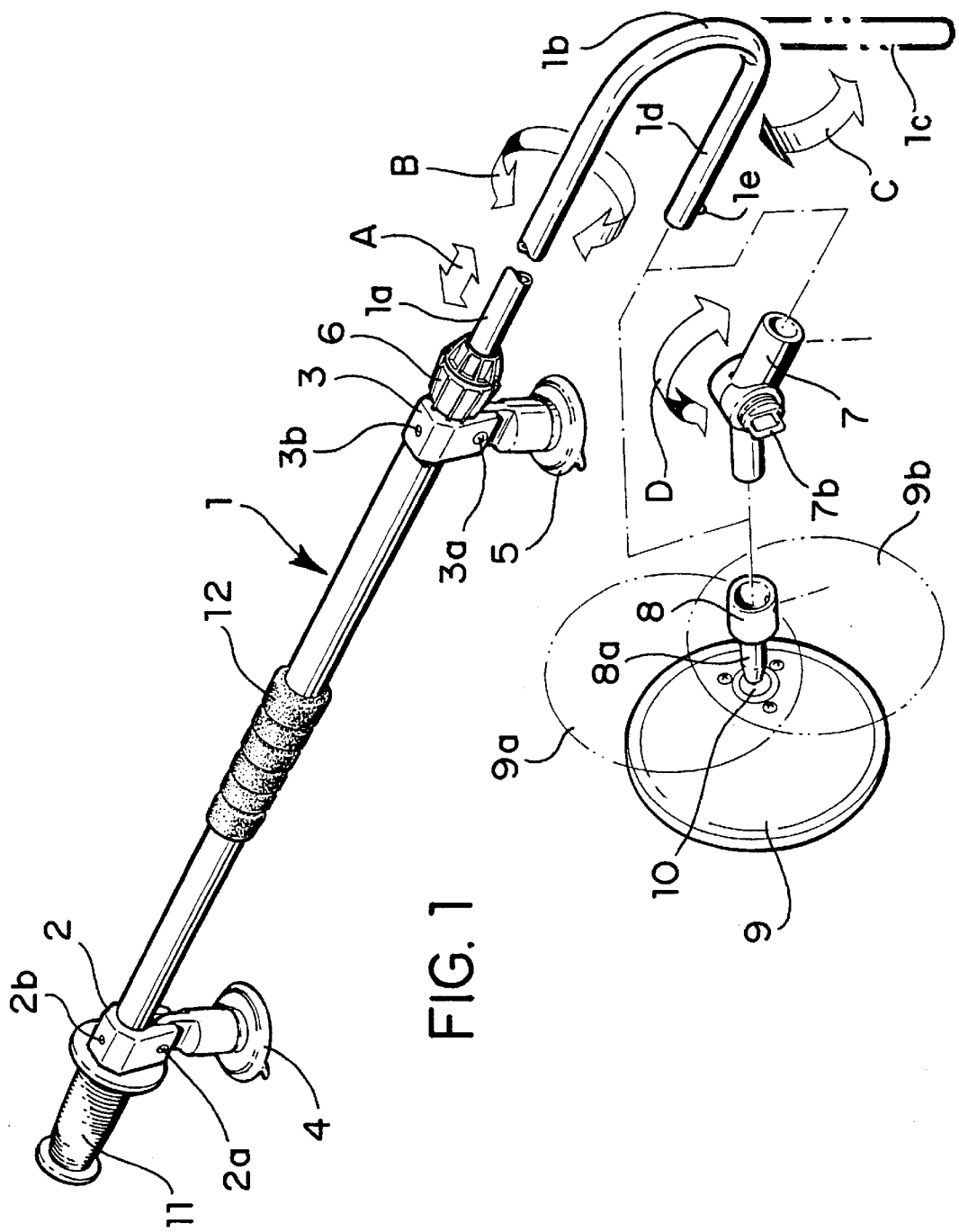
FIG. 1 shows a perspective view of the individual elements of the visual aid device, also in a somewhat exploded view.

In FIG. 1 the visual aid device is shown in a perspective view. The basic support is a tubular support shaft 1 which can be made of different materials while aluminum is preferred. The tubular support shaft 1 is being supported on a vehicle (FIG. 2) by way of two stanchions 2 and 3, respectively, having clamping members 2a and 3a respectively. The clamping members 2a and 3a can be moved to many different positions along the tubular support shaft which is dictated by the type of vehicle on which the visual aid device is to be used or installed. The stanchions 2 and 3 can also be mounted along the tubular support shaft 1 by way of set screws 2b and 2b, respectively, in a more permanent manner. Below the stanchions 2 and 3 there are shown the mounting members 4 and 5 which will mount the aid device at the appropriate location on the towing vehicle. The mounting members 4 and 5 can either be suction cups (shown in FIG. 1) or they can be magnets. The use of one or the other depends on the structure of the vehicle on which the visual aid device is to be mounted. A vinyl roof, for example, obviously will not lend itself to suction cups because it is not a smooth surface. However, the metal under the vinyl material will be instrumental in attracting the magnets. On the other hand, smooth metal roots, trunk lids or metal side panels of panel trucks will easily accept the magnets. At the same time, suction cups will do just as well. It is suggested and contemplated that the support members 4 and 5 be made interchangeably with the stanchions 2 and 3 and could be included with the visual aid device at the point of sale.

The tubular support shaft 1 can be made to extend to greater lengths by the tubular telescoping extension support shaft 1a which slides within the tubular support shaft 1 as is shown by the arrow A. The tubular telescoping extension support shaft 1a can be arrested relative to the tubular support shaft 1 in any predetermined position by way of the compression fitting 6. The telescoping extension support shaft 1a can also be rotated relative to the support shaft 1, as is illustrated by the arrow B, with the position of the relative rotation again being controlled by the compression fitting 6. The forward end of the telescoping support shaft 1a has a bent section therein. This bend can include an angle of at least 90°, as is illustrated by the arrow C and the phantom lines 1c of the extension shaft 1a, including a complete reversal at 180° as is shown Fig. 1. This bend must be made when constructing or assembling the visual aid device and is not intended to be changed by hand at will. This bend will depend on the type of vehicle the device is to be mounted on. Experiments have shown that and angle of 135° is sufficient to accommodate most vehicles.

The end 1d of the bent section 1b can receive a sleeve 8 of an extension mounting the convex mirror 9 thereon. The sleeve 9 can easily be attached to the end 1d and held in place by a spring clip 1e. At the same time, the sleeve 8 can just as easily be removed from the end 1d. It is to be noted that the mirror 9 is mounted to the extension 8a of the sleeve 8 in an eccentric manner at 10. The reason for this eccentric mounting is to enlarge the adjustability of the mirror 9 which is demonstrated by the phantom lines 9a and 9b. In order to still further enlarge the adjustability of the mirror to a greater extent, an adjustable joint 7 may be interposed between the end 1d and the sleeve 8. The joint 7 can be clamped into different angles, as is shown by the arrow D, and may be clamped into any adjusted position by the clamp knob 7b.

The support shaft 1 may be supplied with hand grips, such as an end hand grip 11 and an intermediary hand grip 12.

Figure 2:
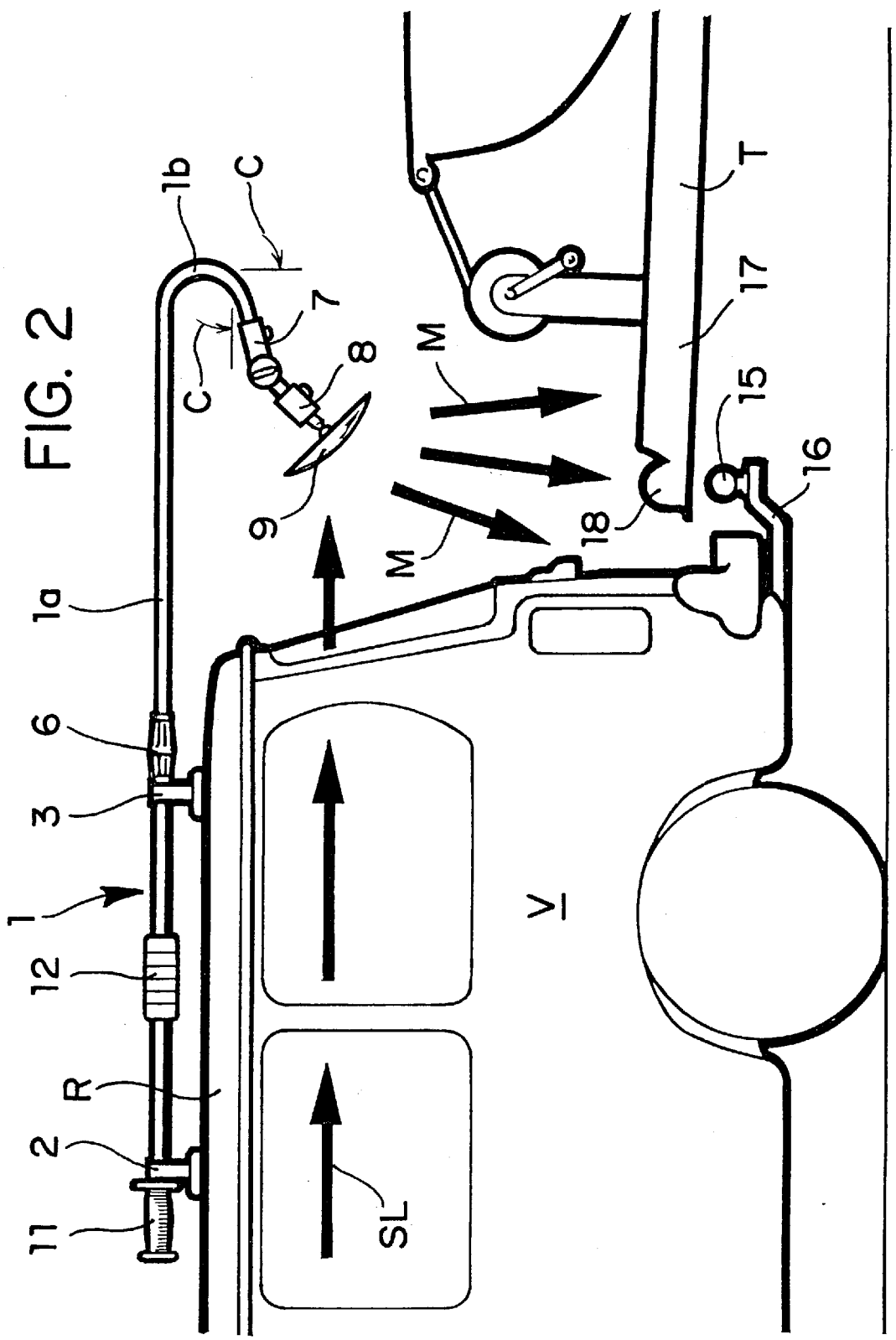
FIG. 2 illustrates the device of FIG. 1 installed on a vehicle.

Turning now to FIG. 2 which shows the visual aid device installed on a vehicle. The same reference characters have been used as in FIG. 1 to identify the same elements and no further explanation is deemed to be necessary to gain an understanding of FIG. 2. To this end, the vehicle V shown in FIG. 2 could be a van or an SUV having a rear window or two doors which meet in the middle of the rear of the vehicle V. It is assumed that the roof R is metal so that either the magnetic mounting devices or the suction cups 4 and 5 may be used to mount the visual aid device. In this illustration, the telescoping support shaft 1a has been extended to a predetermined length at least to a position behind the rear doors of the vehicle V. It is to be noted that the bent section 1b of the support shaft 1a exhibits an angle of more than 90° but less than 180°, see arrow C of FIG. 1 and FIG. 2. This illustration shows the adjustable joint 7 as being included in directing the mirror 9 into its proper direction, although it is believed that the same direction for the mirror can be achieved without the presence of the joint 7 because of the eccentric mounting of the mirror itself.

The vehicle V has at its end a hitch 16 having the ball 15 thereon and the trailer T has a tongue 17 with the usual socket 18 thereon. These items are well known and are standard in any towing situation. In order to align the socket 18 with the ball 15, the mirror 9 is adjusted so that the sight line SL from the driver either by looking backward or looking into the rear view mirror will be magnified by the convex mirror which spreads out the sight lines to a larger viewing area M whereby both the ball and the socket 18 can be observed and aligned with each other from the driver's seat.

Figure 3:
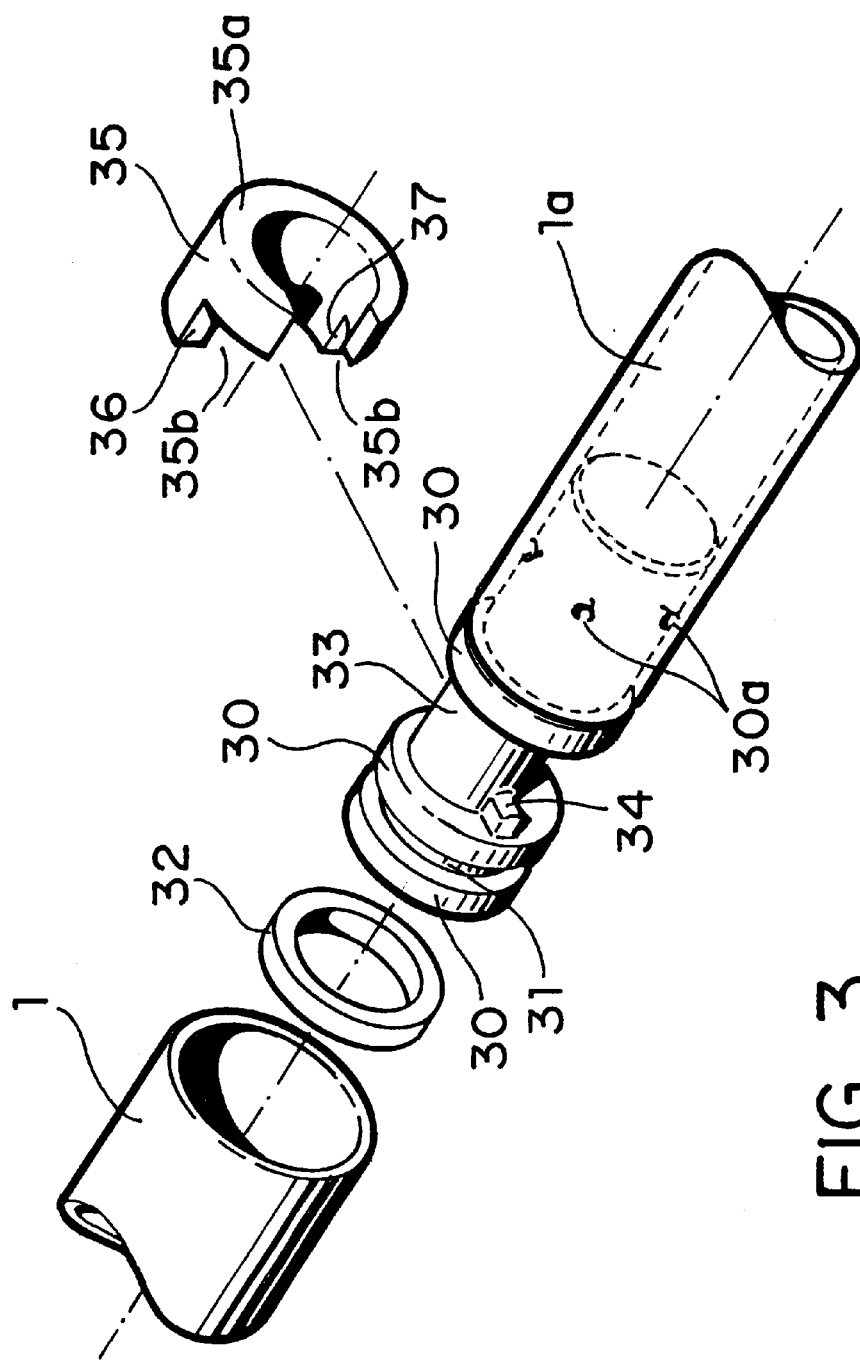
FIG. 3 shows details of an eccentric friction coupling.

Turning now to FIG. 3 which shows a different arresting fitting. The inner diameter of the telescoping support shaft 1a receives a central bushing 30 which is fastened therein by way of dimples 30a. The forward end of the central bushing 30 has a circular recess therein to receive the rubber ring 32 therein. The central bushing 30 also has an eccentric shaft 33 intermediate its ends. On the eccentric shaft 33 an eccentric bushing 35 is received by snap-fitting the same over the eccentric shaft 33. The eccentricity of the bushing 35 can be observed at 35a. The eccentric shaft 33 also a stop 34 thereon. The eccentric bushing 35 has a cutout 35b therein.

In operation, when the plastic eccentric bushing is snapped over the eccentric shaft 33 and the central bushing 30 with its rubber ring 32 thereon is inserted into the interior of the support shaft 1, the telescoping support shaft be may rotated. Thereby, the eccentric bushing will slide around the eccentric shaft because the stop 34 abuts against the stop edge 36 to thereby bring the eccentricity between the bushing 35 and the shaft 33 to its greatest extent whereby the bushing 35 will clamp itself within the interior wall of the support shaft 1. In reverse, the stop 34 will encounter the other stop edge 37 and will undo the frictional connection between the interior wall of shaft 1 and the exterior of the bushing 35. which spreads out the sight lines to a larger viewing area M whereby both the ball and the socket 18 can be observed and aligned with each other from the driver's seat.

Turning now to FIG. 3 which shows a different arresting fitting. The inner diameter of the telescoping support shaft 1a receives a central bushing 30 which is fastened therein by way of dimples 30a. The forward end of the central bushing 30 has a circular recess therein to receive the rubber ring 32 therein. The central bushing 30 also has an eccentric shaft 33 intermediate its ends. On the eccentric shaft 33 an eccentric bushing 35 is received by snap-fitting the same over the eccentric shaft 33. The eccentricity of the bushing 35 can be observed at 35a. The eccentric shaft 33 also a stop 34 thereon. The eccentric bushing 35 has a cutout 35b therein.

In operation, when the plastic eccentric bushing is snapped over the eccentric shaft 33 and the central bushing 30 with its rubber ring 32 thereon is inserted into the interior of the support shaft 1, the telescoping support shaft (1a) be may rotated. Thereby, the eccentric bushing will slide around the eccentric shaft because the stop 34 abuts against the stop edge 36 to thereby bring the eccentricity between the bushing 35 and the shaft 33 to its greatest extent whereby the bushing 35 will clamp itself within the interior wall of the support shaft 1. In reverse, the stop 34 will encounter the other stop edge 37 and will undo the frictional connection between the interior wall of shaft 1 and the exterior of the bushing 35.

I claim:

1. A visual alignment aid device for connecting a towing vehicle having a ball on a hitch to a trailer having a socket on a tongue, said visual aid device includes an elongated tubular shaft, means for supporting said tubular shaft on a towing vehicle, said means for supporting said elongated tubular shaft being adapted to be horizontally mounted on a roof of the towing vehicle, said elongated tubular shaft having a slidable telescoping tubular shaft therein, means for arresting said telescoping shaft at an extended length adjustment and at a rotational position relative to said tubular shaft, said telescoping shaft having in a section remote from said means for arresting a rigid bend of at least 90° therein, a sleeve is separably attached to an end of said bent shaft, said sleeve having an extension thereon and said extension having a convex mirror mounted thereon.

2. The visual alignment aid device of claim 1, wherein the angle of said bend is in a range of 90° to 180°.

3. The visual alignment aid device of claim 1, wherein said convex mirror is attached to said extension in an eccentric position.

4. The visual alignment aid device of claim 1 including an adjustable joint being interposed between said sleeve of said mirror and said end of said telescoping shaft.

5. the visual alignment aid device of claim 1, wherein said means for supporting include at least two stanchions mounted on said tubular shaft and spaced apart from each other.

6. The visual alignment aid device of claim 5 including at least two hand grips mounted on said tubular shaft, one hand grip is located at an outer end of said tubular shaft and another hand grip is mounted on said tubular shaft.

7. The visual alignment aid device of claim 6 including a magnet on each of said stanchions.

8. The visual alignment aid device of claim 6 including a suction cup on each of said stanchions.

9. The visual alignment aid device of claim 1 wherein said means for arresting is an eccentric friction device.

10. The visual alignment aid device of claim 1, wherein the means for arresting is a compression fitting.

* * * * *